(12) United States Patent
Ota et al.

(10) Patent No.: US 7,431,758 B2
(45) Date of Patent: Oct. 7, 2008

(54) CERIUM OXIDE PARTICLES AND PRODUCTION METHOD THEREFOR

(75) Inventors: Isao Ota, Nei-gun (JP); Kenji Tanimoto, Nei-gun (JP); Noriyuki Takakuma, Nei-gun (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 427 days.

(21) Appl. No.: 10/532,316

(22) PCT Filed: Oct. 28, 2003

(86) PCT No.: PCT/JP03/13754

§ 371 (c)(1),
(2), (4) Date: Apr. 22, 2005

(87) PCT Pub. No.: WO2004/037722

PCT Pub. Date: May 6, 2004

(65) Prior Publication Data

US 2006/0150526 A1    Jul. 13, 2006

(30) Foreign Application Priority Data

Oct. 28, 2002  (JP) ............... 2002-312860
Oct. 28, 2002  (JP) ............... 2002-312869

(51) Int. Cl.
*C09G 1/02* (2006.01)
*B01J 23/00* (2006.01)
*C01F 17/00* (2006.01)
*B24D 3/02* (2006.01)

(52) U.S. Cl. ............... 106/3; 502/304; 423/263; 51/309

(58) Field of Classification Search ............... 502/304; 51/309; 423/263; 106/3
See application file for complete search history.

(56) References Cited

U.S. PATENT DOCUMENTS 5,994,260 A    11/1999    Bonneau et al.

FOREIGN PATENT DOCUMENTS

| EP | 0 939 431 A1 | 9/1999 |
|---|---|---|
| EP | 1 201 607 A1 | 5/2002 |
| JP | A 05-105428 | 4/1993 |
| JP | 07-081932 | * 3/1995 |
| JP | A 07-081932 | 3/1995 |
| JP | A 10-106990 | 4/1998 |
| JP | A 10-152673 | 6/1998 |
| WO | WO00/73211 A1 | * 7/2000 |

OTHER PUBLICATIONS

Ivanov E.N. et al., Effect of the heat treatment of cerium carbonate on the microstructure and polishing capacity of cerium dioxide, Tsvetn., Met., 1989, vol. 5, pp. 80 to 83 (Russ.), Columbus, OH, USA.: Chemical abstracts, vol. 111, No. 16, Oct. 16, 1989, p. 157, col. 2, the abstract No. 136865d.

Savin V.D. et al., Thermochemical studies of decomposition of cerium carbonate, Zh, Fiz.Khim. 1985, vol. 59, No. 3, pp. 571 to 575 (Russ.), Columbus, OH, USA: Chemical abstracts, vol. 102, No. 22, Jun. 3, 1985, p. 799, col. 2, the abstract No. 196917w.

* cited by examiner

*Primary Examiner*—Jerry Lorengo
*Assistant Examiner*—Shuangyi Abu Ali
(74) *Attorney, Agent, or Firm*—Oliff & Berridge, PLC

(57) ABSTRACT

The production method for cerium oxide particles of the present invention is a method of producing a cerium oxide particle by heating a cerium compound from a normal temperature to a temperature range of 400° C. to 1200° C., and comprises at least a temperature raising stage of a temperature rise speed of 2° C./hour to 60° C./hour, or proceeds via a stage of heating while supplying a humidified gas in a temperature raising process. By the method of the present invention, a cerium oxide powder whose particle diameter distribution of primary particles is narrow can be obtained. An aqueous cerium oxide slurry produced from the powder enables an improvement in the productivity and a reduction in the cost of a polishing step, because if it is used as an abrasive a high-quality polished face is obtained without deteriorating the polishing speed. The aqueous cerium oxide slurry of the present invention is particularly useful as an abrasive for final finish of a substrate whose main component is silica.

8 Claims, No Drawings

CERIUM OXIDE PARTICLES AND PRODUCTION METHOD THEREFOR

TECHNICAL FIELD

The present invention relates to cerium oxide particles and a production method therefor.

BACKGROUND ART

A cerium oxide abrasive containing a slurry in which cerium oxide particles obtained by subjecting a cerium oxide compound obtained by calcining a hydrate of a cerium compound at a temperature of 350° C. or higher but of 500° C. or lower to a pulverizing process and then calcining it at a temperature of 600° C. or higher are dispersed in a medium is disclosed, for example, in Claims in a below-mentioned patent literature 1. In Example 1 in the below-mentioned patent literature 1, it is described that if a material that has been calcined at 400° C. for 2 hours is pulverized by a ball mill and is then re-calcined at 800° C. for 2 hours, a material whose particle diameter is uniform with the primary particle diameter being 200 nm is obtained. [patent literature 1: refer to Japanese Patent Laid-Open Publication No. Hei 10-106990 (Claims, Example 1)]

A cerium oxide abrasive containing a slurry in which cerium oxide particles with the median of a primary particle diameter distribution being 30 nm to 250 nm and the median of a particle diameter distribution being 150 nm to 600 nm are dispersed in a medium is disclosed, for example, in Claims in a below-mentioned patent literature 2. In Example 1 in the below-mentioned patent literature 2, it is described that by calcining cerium carbonate at 800° C. for 2 hours, a cerium oxide with the median of the distribution of primary particle diameters being 190 nm and the specific surface area being 10 $m^2/g$ is obtained. Furthermore, in Example 2 in the below-mentioned patent literature 2, it is described that by calcining cerium carbonate at 700° C. for 2 hours, a cerium oxide with the median of the distribution of primary particle diameters being 50 nm and the specific surface area being 40 $m^2/g$ is obtained. [patent literature 2: refer to Japanese Patent Laid-Open Publication No. Hei 10-152673 (Claims, Example 1 and Example 2)]

A production method for cerium dioxide ($CeO_2$) in which cerium carbonate is turned into cerium monooxycarbonate by performing a heating process under a high humidity having a relative humidity of 80% or higher in a temperature range of 60° C. to 100° C., and then calcining is carried out, is disclosed, for example, in Claims in a below-mentioned patent literature 3. In Example 1 in the below-mentioned patent literature 3, it is described that hexagonal platy cerium carbonate is put into a constant temperature and humidity chamber, and a humidifying-drying process is performed at 85° C. and a relative humidity of 95% for 8 hours so as to obtain acicular cerium monooxycarbonate $Ce_2(CO_3)_2 \cdot H_2O$, and this is calcined at 400° C. for 2 hours so as to obtain a cerium oxide with the specific surface area being 153 $m^2/g$, and this is re-calcined at 800° C. for 5 hours, so that a cerium oxide of 15.2 $m^2/g$ is obtained. Furthermore, in Comparative Example 2 in the below-mentioned patent literature 3, it is described that if hexagonal platy cerium carbonate is put into an autoclave and a hydrothermal process is performed at 120° C. for 8 hours, basic cerium carbonates $Ce_2(CO_3)_2 \cdot H_2O$ in a hexagonal platy form and a spherical form are obtained, and the amount of production of cerium monooxycarbonate is 5% of the total, and the material is calcined at 400° C. for 2 hours so as to obtain a cerium oxide of 112 $m^2/g$ in specific surface area, and this is re-calcined at 800° C. for 5 hours, so that a cerium oxide of 2.8 $m^2/g$ is obtained. [patent literature 3: refer to Japanese Patent Laid-Open Publication No. Hei 7-81932 (Claims, Example 1 and Comparative Example 2)]

DISCLOSURE OF THE INVENTION

While cerium oxide particles are widely used as an abrasive for substrates whose main component is silica, a cerium oxide abrasive capable of attaining a high-quality polished face without surface defects, such as scratches or the like, is strongly desired in recent years. Furthermore, in order to avoid a drop in productivity if a cerium oxide abrasive is used, maintenance of a polishing speed is also desired. To this end, the cerium oxide particles have to be cerium oxide particles in which the numbers of huge primary particles that become a cause of occurrence of scratches and of very small primary particles that become a cause of a polishing speed deterioration. That is, a production method for cerium oxide particles capable of more sharply controlling the primary particle diameter distribution of cerium oxide particles is desired.

In the way to the completion of the present invention, the present inventors investigated the distribution of particle diameters converted from a specific surface area based on a gas absorption method (BET method) (hereinafter, referred to as "BET method-converted particle diameters"), and judged whether uniform cerium oxide particles were obtained.

In the case where a starting material cerium compound is calcined in an actual production, calcining is generally performed by charging a ceramics-made container (sagger) filled with the starting material into an electric furnace or a gas calcining furnace having a capacity of 0.5 $m^3$ or greater. On this occasion, small saggers are used in order to calcine as uniformly as possible; therefore, the number of saggers charged into the calcining furnace sometimes reaches several tens to several hundreds. Furthermore, if a calcining furnace is larger in size, the in-furnace temperature distribution is likely to be greater. Therefore, it is difficult to obtain uniform cerium oxide particles [this herein means cerium oxide particles having the same BET method-converted particle diameter.] in all the saggers, and if a calcining condition that solves this difficulty is found, the yield in the calcining step improves, leading to a cost reduction. Furthermore, in a cerium oxide powder made of cerium oxide particles obtained in this fashion, the primary particle diameter distribution is narrow. Hence, if an aqueous cerium oxide slurry produced from this oxide cerium powder is used as an abrasive, a high-quality polished face is obtained without deteriorating the polishing speed, so that a productivity improvement and a cost reduction of the polishing step are made possible.

As a result of intensive considerations about the calcining conditions for a cerium compound for obtaining a cerium oxide, the present inventors have found that due to a procedure via a stage where the temperature rise speed is set at 60° C./hour or less during a temperature raising stage from a room temperature to a temperature of 400° C. to 1200° C., the difference in the BET-converted particle diameter between a surface layer portion and an internal portion of the cerium oxide powder in a sagger is small, and, with regard to the BET method-converted particle diameters of cerium oxide particles obtained from a plurality of saggers, the value calculated through the following expression I:

$$[(\text{standard deviation})/(\text{average value})] \times 100 \qquad (I)$$

in the expression, (standard deviation) represents a standard deviation of the BET method-converted particle diameters, and (average value) represents an average value of the BET method-converted particle diameters, is between 3 and 10, that is, a cerium oxide powder having uniform BET method-converted particle diameters is obtained, and completed the present invention.

Furthermore, the present inventors also found that in a step of calcining a cerium carbonate hydrate to produce a cerium oxide, a rapid dehydration is suppressed by calcining the cerium carbonate hydrate under a humidified condition from a temperature of 100° C. or higher to a temperature range of 200° C. to 350° C. where the dehydration of the cerium carbonate hydrate occurs, so that a cerium oxide whose primary particle diameter distribution is sharp is obtained.

If the aqueous cerium oxide slurry containing cerium oxide particles obtained through the method of the present invention is used as an abrasive, a high-quality polished face is obtained without deteriorating the polishing speed, so that a productivity improvement and a cost reduction of the polishing step are possible. This calcining method is particularly useful with a Kiln-type furnace, a fluidized bed furnace, etc. in which a humidified gas can be supplied during calcining.

The first aspect of the invention is a method of producing cerium oxide particles by raising a temperature of a cerium compound from a normal temperature and heating the cerium compound to a temperature range of 400° C. to 1200° C., in which the method comprises at least a temperature raising stage of a temperature rise speed of 2° C./hour to 60° C./hour.

The second aspect of the invention is the production method for cerium oxide particles according to the first aspect, wherein the temperature raising stage of the temperature rise speed of 2° C./hour to 60° C./hour is a first temperature raising stage that is continued until the temperature reaches a temperature range of 200° C. to 350° C. after rising from the normal temperature.

The third aspect of the invention is the production method for cerium oxide particles according to the second aspect, wherein after the first temperature raising stage, heating is performed up to the temperature range of 400° C. to 1200° C. in a second temperature raising stage of a temperature rise speed of 2° C./hour to 200° C./hour.

The fourth aspect of the invention is the production method for cerium oxide particles according to any one of the first aspect to the third aspect, wherein after the temperature reaches the temperature range of 400° C. to 1200° C., the temperature is maintained for 10 minutes to 240 hours.

The fifth aspect of the invention is a cerium oxide powder made of cerium oxide particles produced in a ceramics-made container based on the method according to any one of the first aspect to the fourth aspect, in which a difference in BET method-converted particle diameter converted from a specific surface area value obtained through a BET method between cerium oxide particles of a surface layer portion and an internal portion of the powder within the container is within 20% of an average value of BET method-converted particle diameters of cerium oxide particles of the entire powder within the container.

The sixth aspect of the invention is a cerium oxide powder made of cerium oxide particles produced in plural ceramics-made containers based on the method according to any one of the first aspect to the fourth aspect, in which a standard deviation of BET method-converted particle diameters converted from specific surface area values obtained through a BET method, and an average value of the BET method-converted particle diameters are such that the value calculated through the following expression I:

$$[(\text{standard deviation})/(\text{average value})] \times 100 \qquad (I)$$

in the expression, (standard deviation) represents a standard deviation of BET method-converted particle diameters, and (average value) represents an average value of BET method-converted particle diameters, is within a range of 3 and 10.

The seventh aspect of the invention is a method of producing cerium oxide particles by raising a temperature of a cerium compound from a normal temperature and heating the cerium compound to a temperature range of 400° C. to 1200° C., in which the method proceeds via a stage of heating while supplying a humidified gas in a temperature raising process.

The eighth aspect of the invention is the production method for cerium oxide particles according to the seventh aspect, wherein a water vapor in the humidified gas has a value of 0.5 to 0.8 in a partial pressure ratio calculated through the following expression II:

$$H_2O_p/(H_2O_p + \text{gas}_p) \qquad (II)$$

in the expression, $H_2O_p$ represents the partial pressure of water vapor, and $\text{gas}_p$ represents the partial pressure of the gas.

The ninth aspect of the invention is the production method for cerium oxide particles according to the seventh aspect or the eighth aspect, wherein the gas is an oxygen gas, a mixture gas of oxygen and nitrogen, or an air.

The tenth aspect of the invention is the production method for cerium oxide particles according to any one of the seventh aspect to the ninth aspect, wherein supply of the humidified gas is started at a temperature of 100° C. or higher, and is continued until a temperature range of 200° C. to 350° C. is reached.

The eleventh aspect of the invention is the production method for cerium oxide particles according to any one of the seventh aspect to the tenth aspect, wherein the cerium compound is a cerium carbonate hydrate.

The twelfth aspect of the invention is a cerium oxide powder made of cerium oxide particles produced in an atmosphere adjustment type calcining furnace based on the method according any one of the seventh aspect to the eleventh aspect, in which values of particle diameters of the powder measured through a laser diffraction method become 0.1 to 0.3 as a ratio value calculated through the following expression III:

$$(D_{50} - D_{10})/(D_{90} - D_{50}) \qquad (III)$$

in the expression, $D_{10}$ represents a particle diameter that means that the number of particles of this particle diameter or less is 10% of the total number of particles, $D_{50}$ represents a particle diameter that means that the number of particles of this particle diameter or less is 50% of the total number of particles, and $D_{90}$ represents a particle diameter that means that the number of particles of this particle diameter or less is 90% of the total number of particles.

The thirteenth aspect of the invention is an aqueous cerium oxide slurry for use for the polishing of a substrate whose main component is silica, which contains cerium oxide particles produced by the method according to any one of the first aspect to the fourth aspect and the seventh aspect to the eleventh aspect.

The fourteenth aspect of the invention is the aqueous cerium oxide slurry according to the thirteenth aspect, wherein the polishing of a substrate whose main component is silica is the polishing of a rock crystal, a photomask-purpose quartz glass, an organic film for a semiconductor device, a low-dielectric constant film for a semiconductor device, an inter-layer insulator film for a semiconductor device, trench isolation for a semiconductor device, or a glass-made hard disk substrate.

If the aqueous cerium oxide slurry produced from cerium oxide particles of the present invention is used as an abrasive for a substrate whose main component is silica, for example, a rock crystal, a photomask-purpose quartz glass, a semiconductor device, and a glass-made hard disk, polished surfaces with a high-precision smoothness can be efficiently obtained. Therefore, the slurry is useful as a final finish abrasive.

The cerium oxide particles and the cerium oxide slurry obtained in the present invention can be used for polishing surfaces of plating layers of Ni—P and the like provided on aluminum disks that may possibly be provided as industrial products and, particularly: surfaces of hard Ni—P plating layers with compositions of 90% by mass to 92% by mass of Ni and 8% by mass to 10% by mass of P; surfaces of aluminum oxide layers, or surfaces of aluminum, aluminum alloys and anodized aluminum; nitride films and carbide films of semiconductor devices; wiring metals of semiconductor multilayer wiring substrates; etc., and the final finish polishing of magnetic heads and the like as well.

BEST MODES FOR CARRYING OUT THE INVENTION

In the present invention, normal temperature is usually room temperature (20° C.). If a calcining furnace is left standing, the temperature in the calcining furnace becomes equal to the room temperature. As for the calcining furnace, it is preferable that the in-furnace temperature rise from the vicinity of 20° C. However, in actual operations where a calcining furnace is repeatedly used, it is also possible that the in-furnace temperature rise from the vicinity of 40° C. to 50° C. and the present invention be carried out.

As for the cerium compound used in the present invention, a commercial item may be used. For example, a commercial hexagonal platy cerium carbonate hydrate [$Ce_2(CO_3)_3 \cdot nH_2O$ n=6 to 10] whose average particle diameter measured through a laser diffraction method is several μm to several ten μm may preferably be used.

Reasons for performing the initial temperature raise (first temperature raising stage) in the present invention at a temperature rise speed of 2° C./hour to 60° C./hour will be stated below.

In a process of calcining a cerium carbonate hydrate at 400° C. to 1200° C., a dehydration reaction gradually begins at 80° C. to 100° C., and a decarboxylation reaction begins at 100° C. to 180° C. Simultaneously with the decarboxylation reaction, an oxidation reaction occurs. As a result of the dehydration reaction, the decarboxylation reaction, and the oxidation reaction, the cerium carbonate hydrate turns into a cerium oxide. Therefore, in the case where the temperature rise speed from the normal temperature is very fast, the decarboxylation reaction and the oxidation reaction of the cerium carbonate hydrate begin to occur while the dehydration reaction of the cerium carbonate hydrate does not completely end. Hence, in the reaction system, a total of four components, that is, anhydrous cerium carbonate [$Ce_2(CO_3)_3$], cerium oxycarbonate [$Ce_2O(CO_3)_2$] and cerium oxide ($CeO_2$) in addition to the starting material cerium carbonate hydrate [$Ce_2(CO_3)_3 \cdot nH_2O$ n=6 to 10], coexist. Particularly, if cerium carbonate hydrate remains until the time of calcining at 400 to 1200° C., the dehydration reaction, the decarboxylation reaction and the oxidation reaction rapidly occur locally, which becomes a cause of inducing abnormal growth of the primary particle diameter of cerium oxide, so that cerium oxide with nonuniform primary particle diameters will be obtained. Therefore, it is necessary to make the dehydration reaction of the cerium carbonate hydrate end completely by gradually raising the temperature particularly from the normal temperature to a temperature of 200° C. to 350° C. so that no cerium carbonate hydrate will remain at 350° C. or higher.

In the aforementioned case, gradual temperature raise is desirable; however, if the temperature rise speed is slower than 2° C./hour, the temperature raise time becomes excessively long, which is not practical. Therefore, practically, a temperature rise speed of 2° C./hour to 60° C./hour, and especially 10° C./hour to 30° C./hour, can be said to be more preferable.

After the temperature range of 200° C. to 350° C. is reached in the first temperature raising stage, a second temperature raising stage is entered. It is permissible to perform the second temperature raising stage after maintaining the temperature reached in the first temperature raising stage for 1 hour to 100 hours, and it is also permissible to transfer to the second temperature raising stage continuously from the temperature reached in the first temperature raising stage.

After the first temperature raising stage, it is preferable to perform the second temperature raising stage at a temperature rise speed of 2° C./hour to 200° C./hour so as to heat to the range of 400° C. to 1200° C. It is advisable to perform the second temperature raising stage at a temperature rise speed that is the same as or higher than that of the first temperature raising stage. Specifically, for example, if the temperature rise speed of the first temperature raising stage is 30° C./hour, the temperature rise speed of the second temperature raising stage may be 40° C./hour. The temperature rise speed of the second temperature raising stage is 2° C./hour to 200° C./hour, and preferably 30° C./hour to 150° C./hour.

Intended cerium oxide particles of the present invention can be obtained by heating the cerium compound until the temperature reaches the temperature range of 400° C. to 1200° C. in the second temperature raising stage, and usually the temperature range of 600° C. to 1100° C.

It is advisable that the hold time on the occasion of calcining at 400° C. to 1200° C. be, for example, 10 minutes to 240 hours. Even if the hold time exceeds 240 hours, there will be no harm. However, since the temperature is gradually raised, the particle growth of cerium oxide substantially ends within 60 hours of the hold time at a maximum temperature. Therefore, even if the hold time exceeds 240 hours, the effect thereof is considered to be small.

In the present invention, the aforementioned cerium compound is put into ceramic-made containers (for example, saggers), and is calcined in a calcining furnace. The calcining furnace used in the present invention may be an electrical furnace or a gas calcining furnace of a batch type or a continuous type.

As a material of the ceramics-made container (sagger), an alumina material, a mulite material, a mulite cordierite material, cordierite material, etc. may be cited.

As for the cerium oxide powder produced in ceramics-made containers (saggers) on the basis of the production method of the present invention, it is preferable that the difference in the BET method-converted particle diameter converted from a specific surface area value obtained through the BET method between the cerium oxide particles of a surface layer portion and an internal portion of the powder in the container is preferably within 20% of the average value of the BET method-converted particle diameters of cerium oxide particles of the entire powder within the container.

In the cerium oxide powder present in a ceramics-made container (sagger), the surface layer portion of the cerium oxide powder refers to a portion of the cerium oxide powder that is present within a depth of ⅕ to ¼ from the surface with respect to the depth of the powder from the surface in contact with air to a bottom portion, with reference to the direction of the depth.

In the case where the difference in the BET method-converted particle diameter exceeds 20% of the average value of BET method-converted particle diameters, the distribution of the BET method-converted particle diameters of cerium oxide particles becomes excessively wide. Therefore, the case is not preferable.

The cerium oxide powder made of cerium oxide particles produced in a plurality of ceramics-made containers (saggers) based on the aforementioned method is preferably a cerium oxide powder wherein a standard deviation of BET method-converted particle diameters converted from specific surface area values obtained through the BET method, and an average value of the BET method-converted particle diameters are such that the value calculated through the following expression I:

$$[(\text{standard deviation})/(\text{average value})] \times 100 \quad (I)$$

in the expression, (standard deviation) represents a standard deviation of BET method-converted particle diameters, and (average value) represents an average value of BET method-converted particle diameters, is within the range of 3 and 10.

If the value calculated through the expression I exceeds 10, the distribution of the BET method-converted particle diameters of cerium oxide particles becomes excessively wide, which is not preferable. Furthermore, taking into account the measurement precision of the BET method-converted particle diameters of cerium oxide particles, values less than 3 calculated through the expression I with regard to the cerium oxide particles obtained from a plurality of saggers are considered to be impractical values.

With regard to the cerium oxide particles obtained through calcining, the particle diameter converted from a specific surface area value obtained through the BET method is 10 nm to 500 nm, and the primary particle diameter based on observation with a scanning type electron microscope is 5 nm to 800 nm.

When cerium oxide particles are produced by raising the temperature of a cerium compound from the normal temperature and heating the cerium compound to the temperature range of 400° C. to 1200° C., it is permissible to proceed via a stage of heating while supplying a humidified gas in a temperature raising process.

Reasons for using a humidified gas in the temperature raising process will be explained below.

As stated above, in the process of calcining cerium carbonate hydrate at 400° C. to 1200° C., the dehydration reaction gradually begins at 80° C. to 100° C., and the dehydration reaction becomes faster after 100° C. is exceeded, and ends between 200° C. and 350° C. The decarboxylation reaction begins at 100° C. to 180° C. Simultaneously with the decarboxylation reaction, the oxidation reaction occurs as well. As a result of the dehydration reaction, the decarboxylation reaction and the oxidation reaction, cerium carbonate hydrate turns into a cerium oxide. The decarboxylation reaction and the oxidation reaction substantially end between 250° C. and 350° C. Therefore, if the partial pressure of water vapor in the calcining atmosphere is low from a temperature of 100° C. or higher to a temperature between 200° C. and 350° C., rapid dehydration of cerium carbonate hydrate occurs, and simultaneously, rapid decarboxylation and oxidation reactions occur as well. Thus, there is created a cause of inducing abnormal growth of primary particles (abnormal increase in primary particle diameter) of cerium oxide.

Therefore, it is preferable to relax the dehydration reaction speed of cerium carbonate hydrate by supplying a humidified gas that has a value of 0.5 to 0.8 in the partial pressure ratio calculated through the following expression II:

$$H_2O_p/(H_2O_p + \text{gas}_p) \quad (II)$$

in the expression, $H_2O_p$ represents the partial pressure of water vapor, and $\text{gas}_p$ represents the partial pressure of the gas. That is, it is preferable to start supplying the humidified gas at a temperature of 100° C. or higher and continue the supply until the temperature range of 200° C. to 350° C. is reached.

As the humidified gas, for example, an oxygen gas, a mixture gas of oxygen and nitrogen, or air may be cited. Air is easy to handle and inexpensive, and is most preferable. The flow rate of these gases is preferably 0.1 liter/minute to 100 liters/minute for 100 g of cerium carbonate hydrate.

However, if, on the occasion of calcining, a gas containing water vapor of a partial pressure higher than the saturated water vapor pressure (humidified gas) is supplied in the temperature range from the room temperature and below 100° C., there is a fear of water vapor in the humidified gas condensing in the calcining atmosphere. If this phenomenon occurs, for example, in the case where a continuous-type Kiln furnace to which a starting material powder is continuously supplied is used, there is possibility that the starting material powder and condensed water may mix and solidify to a moist cake state, and the starting material powder may become unable to move in the calcining furnace, and thus the furnace may be blocked. Furthermore, in the case where a fluidized bed furnace is used, there is possibility that solidified moist cake may clog gas eject holes and the fluidized bed calcining cannot be carried out. Therefore, in the temperature region below 100° C., it is advisable to perform the calcining under the flow of a not-humidified gas (for example, under the flow of an air that is not adjusted in humidify), or perform the calcining under natural convection.

At temperatures exceeding 350° C., the dehydration reaction of cerium carbonate hydrate has ended, and the supply of a humidified gas is ineffective. Therefore, it is preferable that the supply of a humidified gas be stopped after a temperature of 200 to 350° C. is reached, and, after that, calcining be carried out under the flow of a not-humidified gas (for example, under the flow of an air that is not adjusted in humidity) or calcining be carried out under natural convection.

In the case where a humidified gas is used, the temperature rise speed from the room temperature to a temperature of 400° C. to 1200° C. may be a temperature rise speed that is usually used in this field, and practically a temperature rise speed of 10° C./hour to 120° C./hour is preferable.

In the case where a humidified gas is used, the hold time in the calcining at 400° C. to 1200° C. is usually 10 minutes to 240 hours. Even if the hold time exceeds 240 hours, there will be no harm. However, since the temperature is gradually raised during calcining, the particle growth of cerium oxide substantially ends within 60 hours of the hold time at a maximum temperature. Therefore, even if the hold time exceeds 240 hours, the effect thereof is considered to be small.

The calcining furnace used in the present invention is preferably an atmosphere adjustment type calcining furnace, such as a fluidized bed furnace, a Kiln type continuous furnace, etc., in which a humidified gas can be supplied during temperature rise.

The cerium oxide powder of the present invention obtained by using a humidified gas is a cerium oxide powder in which values of particle diameters of the powder measured through a laser diffraction method become 0.1 to 0.3 as a ratio value calculated through the following expression III:

$$(D_{50}-D_{10})/(D_{90}-D_{50}) \quad (III)$$

in the expression, $D_{10}$ represents a particle diameter that means that the number of particles of this particle diameter or less is 10% of the total number of particles, $D_{50}$ represents a particle diameter that means that the number of particles of this particle diameter or less is 50% of the total number of particles, and $D_{90}$ represents a particle diameter that means that the number of particles of this particle diameter or less is 90% of the total number of particles. In the case where the ratio value exceeds 0.3, a particle diameter distribution with a large proportion of coarse particles results, and, on the occasion of use as an abrasive, there is a fear of many scratches occurring in a polished face. If the ratio value is less than 0.1, a particle diameter distribution with a large proportion of fine particles results, and, on the occasion of provision as an abrasive, there is a fear of the polishing speed slowing down.

By dispersing cerium oxide particles produced by the method of the present invention in a suitable aqueous medium, the aqueous cerium oxide slurry of the present invention can be produced. This dispersion can be performed by using a conventional wet type pulverizing apparatus, such as a ball mill, a sand grinder, an attritor, etc.

As for the aqueous cerium oxide slurry of the present invention, the average particle diameter of the cerium oxide particles measured through a laser diffraction method is within the range of 50 nm to 600 nm. This aqueous cerium oxide slurry can be obtained by wet-pulverizing the cerium oxide powder of the present invention for 1 hour to 72 hours in an aqueous medium of pH 3 to 11 containing 10% by mass to 60% by mass of cerium oxide.

The aqueous cerium oxide slurry of the present invention may be adjusted to pH 1 to 6 by adding an acidic substance. As the acidic substance, nitric acid, hydrochloric acid, acetic acid, etc. may be cited. The aqueous cerium oxide slurry of the present invention may be adjusted to pH 8 to 13 by adding a basic substance. As the basic substance, ethanolamine, diethanolainine, triethanolamine, N,N-dimethylethanolamine, methylethanolamine, monopropanolamine, ammonia, etc. as well as sodium hydroxide, potassium hydroxide and tetramethylammonium hydroxide may be cited.

In the aqueous cerium oxide slurry of the present invention, it is possible to add various additives in accordance with desire, for example, aqueous macromolecules, anionic surface active agents, nonionic surface active agents, cationic surface active agents, etc. Specifically, for example, aqueous macromolecules, such as polyvinyl alcohols, acrylic acid polymers and ammonium salts thereof, methacrylic acid polymers and ammonium salts thereof, etc.; anionic surface active agents, such as ammonium oleate, ammonium laurylate, triethanolamine lauryl sulfate, polyoxyethylene lauryl ether ammonium sulfate, etc.; nonionic surface active agents, such as polyoxyethylene lauryl ether, polyoxyethylene sorbitan monolaurate, polyoxyethylene glycol distearate, polyethylene glycol monostearate, etc.; etc. These may be added at a proportion of 0.01 part by weight to 300 parts by weight with respect to 100 parts by weight of cerium oxide particles.

The aqueous cerium oxide slurry of the present invention can be particularly preferably used for the polishing of substrates whose main component is silica. The polishing of substrates whose main component is silica means the polishing of various films (functional films) formed on the aforementioned substrates in addition to the polishing of the aforementioned substrates themselves. As this polishing, specifically, the polishing a rock crystal, a photomask-purpose quartz glass, an organic film for a semiconductor device, a low-dielectric constant film for a semiconductor device, an inter-layer insulator film for a semiconductor device, trench isolation for a semiconductor device, or a glass-made hard disk substrate may be cited as examples.

Hereinafter, the present invention will be described more specifically with reference to Examples (including measurement examples, comparative examples and test examples), but this does not limit the scope of the present invention.

EXAMPLES

Analytical methods adopted in the present invention are as described below.

(1) pH Measurement

The measurement was done by using a pH meter [HM-30S made by (KK) Toa Denpa Kogyo].

(2) Measurement of Electric Conductivity

The measurement was done by using a diagometer [CM-30G made by (KK) Toa Denpa Kogyo].

(3) Measurement of Average Particle Diameters Through Laser Diffraction Method

The average particle diameters were measured by using a laser diffraction method particle diameter measuring device MASTERSIZER 2000 (made by MALVERN Co.).

(4) Particle Diameters Converted from Specific Surface Area Values Obtained Through the BET Method (Gas Adsorption Method) (Bet Method-Converted Particle Diameters)

With regard to specimens dried beforehand in predetermined conditions, a value of specific surface area was measured by using a nitrogen adsorption method specific surface area meter (MONOSORB MS-16 Model made by QUNTACHROME Co.), and from the measured value, a BET method-converted particle diameter was calculated.

(5) Observation of Primary Particle Diameters of Cerium Carbonate Hydrate and Cerium Oxide with a Scanning Type Electron Microscope Electron microscopic photographs of specimens were taken by a scanning type electron microscope (FE-SEM S-4100 made by (KK) Nihon Denshi (KK), and primary particle diameters were observed.

(6) Measurement by Powder X-ray Diffraction

Using a powder X-ray diffraction apparatus [made by Rigaku Denki (KK)], a compound obtained by calcining was identified. Furthermore, the half value width of the hk1 (111) of cerium oxide was measured, and an X-ray crystallite diameter was determined by a Debye-Sherrer method.

(7) Measurement Method for the Amount of Small Particles 37 g of a pulverized slurry diluted with pure water to a solid content of 17% by mass was charged into a centrifugal tube of 50 mL. After centrifugation at 3000 rpm (G=1000) for 10 minutes, 22.5 g of a supernatant liquid was collected, and was dried at 110° C. The mass of the powder thus obtained was divided by the mass of the solid content in the slurry prior to the centrifugation, so as to determine an amount of small particles. It was found as a result of observation with a scanning type electron microscope that the small particles were particles smaller than 30 nm.

(8) Measurement and Scanning Type Electron Microscopic Observation of BET method-converted particle diameters of large particles 115 g of a pulverized slurry diluted with pure water to a solid content of 15% by mass was charged into a glass-made sedimentation tube of 100 mL. After one day, 2 mL of a slurry was collected from a bottom portion of the tube. After the collected slurry was dried in predetermined conditions, a specific surface area value was measured and a BET method-converted particle diameter was determined similarly to (4). Furthermore, the slurry was dried, and primary particle diameters of particles were observed with a scanning type electron microscope.

(9) Measurement of the Number of Residual Particles of 0.2 μm or Larger

After polish-tested wafers were washed, the number of scratches and the number of particles of 0.2 μm or larger remaining on a surface of one wafer were measured by using a particle measuring device Surfscan 6420 (made by Tencor Co.)

(10) Measurement of Remaining Oxide Film Thickness after the Polish Test

The remaining oxide film thickness of a polished wafer was measured with an oxide film thickness meter NANOSPEC AFT 5100 (made by NANOSPEC Co.), and a polishing speed was calculated from the initial oxide film thickness (1000 Å).

(Preparation of Polishing Compositions)

Example 1

20 g of cerium carbonate hydrate (50% by mass in terms of $CeO_2$ was contained) having platy particles of 2 μm to 10 μm based on observation with a scanning type electron microscope and an average particle diameter of 38 μm based on a laser diffraction method was charged into a porcelain crucible. After being lidded, the crucible was charged into an electric furnace, and the temperature was raised at a temperature rise speed of 30° C./hour from the room temperature to 350° C. After the temperature was held at 350° C. for 10 minutes, the crucible was taken out of the electric furnace, so that 10.2 g of a powder (A-1) was obtained. The powder (A-1) was subjected to measurement with a powder X-ray diffraction apparatus. In spectral peaks, a peak that coincided with a characteristic peak of cerium oxide was seen. Furthermore, an X-ray crystallite diameter was 9.6 nm. The specific surface area of this powder (A-1) was 163 $m^2/g$, and the BET method-converted particle diameter was 5.1 nm.

20 g of cerium carbonate hydrate was charged into a crucible, and the temperature was raised at a temperature rise speed of 30° C./hour from the room temperature to 350° C. After the temperature was held at 350° C. for 10 minutes, the temperature was raised at a temperature rise speed of 120° C./hour to 770° C. After the temperature was held at 770° C. for 15 hours, the temperature was cooled to the room temperature, so that 10 g of a powder (B-1) was obtained. The powder (B-1) was subjected to measurement with a powder X-ray diffraction apparatus. From spectral peaks, the powder was found to be cerium oxide. Furthermore, an X-ray crystallite diameter was 25.8 nm.

In the powder (B-1), the specific surface area and the BET method-converted particle diameter were different between the powder existing in a surface layer portion of the crucible and the powder existing in an internal portion of the crucible. The specific surface area of the powder in the surface layer portion of the crucible was 14.4 $m^2/g$, and the BET method-converted particle diameter thereof was 58.0 nm. The specific surface area of the powder in the internal portion of the crucible was 16.7 $m^2/g$, and the BET method-converted particle diameter thereof was 50.0 nm.

In the powder (B-1), the average value of the BET method-converted particle diameters of the powder in the surface layer portion of the crucible and the powder in the internal portion of the crucible is 54.0 nm, and the difference (8.0 nm) between the BET method-converted particle diameters of the powder in the surface layer portion of the crucible and the powder in the internal portion of the crucible is 15% in terms of the proportion to the average value (54.0 nm) of the BET method-converted particle diameters, and it can be understood that a cerium oxide powder with the distribution of BET-converted particle diameters being sharp was obtained.

Example 2

20 g of the same cerium carbonate hydrate as in Example 1 (50% by mass in terms of $CeO_2$ was contained) was charged into a porcelain crucible. After being lidded, the crucible was charged into an electric furnace, and the temperature was raised at a temperature rise speed of 60° C./hour from the room temperature to 350° C. After the temperature was held at 350° C. for 10 minutes, the crucible was taken out of the electric furnace, so that 11.6 g of a powder (A-2) was obtained. The powder (A-2) was subjected to measurement with a powder X-ray diffraction apparatus. From spectral peaks, the powder was found to be a mixture of cerium oxycarbonate and cerium oxide.

20 g of cerium carbonate hydrate was charged into a crucible, and the temperature was similarly raised at a temperature rise speed of 60° C./hour from the room temperature to 350° C. After the temperature was held at 350° C. for 10 minutes, the temperature was raised at a temperature rise speed of 120° C./hour to 770° C. After the temperature was held at 770° C. for 15 hours, the temperature was cooled to the room temperature, so that 10 g of a powder (B-2) was obtained. The powder (B-2) was subjected to measurement with a powder X-ray diffraction apparatus. From spectral peaks, the powder was found to be cerium oxide.

In the powder (B-2), the specific surface area and the BET method-converted particle diameter were different between the powder existing in a surface layer portion of the crucible and the powder existing in an internal portion of the crucible. The specific surface area of the powder in the surface layer portion of the crucible was 12.3 $m^2/g$, and the BET method-converted particle diameter thereof was 68.0 nm. The specific surface area of the powder in the internal portion of the crucible was 14.9 $m^2/g$, and the BET method-converted particle diameter thereof was 56.0 nm.

In the powder (B-2), the average value of the BET method-converted particle diameters of the powder in the surface layer portion of the crucible and the powder in the internal portion of the crucible is 62.0 nm, and the difference (12.0 nm) between the BET method-converted particle diameters of the powder in the surface layer portion of the crucible and the powder in the internal portion of the crucible is 19% in terms of the proportion to the average value (62.0 nm) of the BET method-converted particle diameters, and it can be understood that a cerium oxide powder with the distribution of BET-converted particle diameters being sharp was obtained.

Example 3

20 g of the same cerium carbonate hydrate as in Example 1 (50% by mass in terms of $CeO_2$ was contained) was charged into each of three porcelain crucibles. After being lidded, the crucibles were charged into an electric furnace, and the temperature was raised at a temperature rise speed of 30° C./hour from the room temperature to 350° C. After that, the temperature was raised at a temperature rise speed of 120° C./hour to 770° C. After the temperature was held at 770° C. for 15 hours, the temperature was cooled to the room temperature, so that 8.6 g of each of a powder (B-3-1), a powder (B-3-2) and a powder (B-3-3) was obtained. The three kinds of powders were subjected to measurement with a powder X-ray diffraction apparatus. From spectral peaks, each powder was found to be cerium oxide.

In the powder (B-3-1), the powder (B-3-2) and the powder (B-3-3), the specific surface area and the BET method-converted particle diameter were different between the powder existing in a surface layer portion of the crucible and the powder existing in an internal portion of the crucible. The specific surface area of the powder in the surface layer portion of the crucible was 14.7 $m^2/g$ (B-3-1), 14.1 $m^2/g$ (B-3-2) and 13.8 $m^2/g$ (B-3-3), and the BET method-converted particle diameter thereof was 57.0 nm (B-3-1), 59.0 nm (B-3-2) and 61.0 nm (B-3-3). The specific surface area of the powder in the internal portion of the crucible was 16.8 $m^2/g$ (B-3-1), 16.3 $m^2/g$ (B-3-2) and 16.5 $m^2/g$ (B-3-3), and the BET method-converted particle diameter thereof was 50.0 nm (B-3-1), 51.0 nm (B-3-2) and 51.0 nm (B-3-3).

In the powder (B-3-1), the powder (B-3-2) and the powder (B-3-3), the average values of the BET method-converted particle diameters of the powder in the surface layer portion of the crucible and the powder in the internal portion of the crucible were 53.5 nm (B-3-1), 55.0 nm (B-3-2) and 56.0 nm (B-3-3), respectively, and the differences [7.0 nm (B-3-1), 8.0 nm (B-3-2) and 10.0 nm (B-3-1)] between the BET method-converted particle diameters of the powder in the surface layer portion of the crucible and the powder in the internal portion of the crucible were 13%, 15% and 18%, respectively, in terms of the proportion to the average value [53.5 nm (B-3-1), 55.0 nm (B-3-2) and 56.0 nm (B-3-3)] of the BET method-converted particle diameters.

In the powder (B-3-1), the powder (B-3-2) and the powder (B-3-3), the average value of the BET-converted particle diameters at a total of 6 sites in the surface layer portions and the internal portions of the powders are 54.6 nm, and the standard deviation thereof is 4.0 nm. The value calculated through the aforementioned expression I is 7, and it can be understood that a cerium oxide powder with the distribution of BET-converted particle diameters being sharp was obtained.

Comparative Example 1

20 g of the same cerium carbonate hydrate as in Example 1 (50% by mass in terms of $CeO_2$ was contained) was charged into a porcelain crucible. After being lidded, the crucible was charged into an electric furnace, and the temperature was raised at a temperature rise speed of 120° C./hour from the room temperature to 350° C. After the temperature was held at 350° C. for 10 minutes, the crucible was taken out of the electric furnace, so that 12.4 g of a powder (C-1) was obtained. The powder (C-1) was subjected to measurement with a powder X-ray diffraction apparatus. A small amount of cerium carbonate hydrate was detected in addition to cerium oxycarbonate and cerium oxide.

20 g of cerium carbonate hydrate was charged into a crucible, and the temperature was similarly raised at a temperature rise speed of 120° C./hour from the room temperature to 350° C. After the temperature was held at 350° C. for 10 minutes, the temperature was raised at a temperature rise speed of 120° C./hour to 770° C. After the temperature was held at 770° C. for 15 hours, the temperature was cooled to the room temperature, so that 10 g of a powder (D-1) was obtained. The powder (D-1) was subjected to measurement with a powder X-ray diffraction apparatus. From spectral peaks, the powder was found to be cerium oxide.

In the powder (D-1), the specific surface area and the BET method-converted particle diameter were different between the powder existing in a surface layer portion of the crucible and the powder existing in an internal portion of the crucible. The specific surface area of the powder in the surface layer portion of the crucible was 7.5 $m^2/g$, and the BET method-converted particle diameter thereof was 111.0 nm. The specific surface area of the powder in the internal portion of the crucible was 13.7 $m^2/g$, and the BET method-converted particle diameter thereof was 61.0 nm.

In the powder (D-1), the average value of the BET method-converted particle diameters of the powder in the surface layer portion of the crucible and the powder in the internal portion of the crucible is 86.0 nm, and the difference (50.0 nm) between the BET method-converted particle diameters of the powder in the surface layer portion of the crucible and the powder in the internal portion of the crucible is 58% in terms of the proportion to the average value (86.0 nm) of the BET method-converted particle diameters, and it can be understood that a cerium oxide powder with the distribution of BET-converted particle diameters being broad was obtained.

Comparative Example 2

20 g of the same cerium carbonate hydrate as in Example 1 (50% by mass in terms of $CeO_2$ was contained) was charged into a porcelain crucible. After being lidded, the crucible was charged into an electric furnace, and the temperature was raised at a temperature rise speed of 480° C./hour from the room temperature to 350° C. After the temperature was held at 350° C. for 10 minutes, the crucible was taken out of the electric furnace, so that 14.6 g of a powder (C-2) was obtained. The powder (C-2) was subjected to measurement with a powder X-ray diffraction apparatus. The powder was found to be a mixture of cerium carbonate hydrate, cerium oxycarbonate and cerium oxide.

20 g of cerium carbonate hydrate was charged into a crucible, and the temperature was similarly raised at a temperature rise speed of 480° C./hour from the room temperature to 350° C. After the temperature was held at 350° C. for 10 minutes, the temperature was raised at a temperature rise speed of 120° C./hour to 770° C. After the temperature was held at 770° C. for 15 hours, the temperature was cooled to the room temperature, so that 5 g of a powder (D-2) was obtained. The powder (D-2) was subjected to measurement with a powder X-ray diffraction apparatus. From spectral peaks, the powder was found to be cerium oxide.

In the powder (D-2), the specific surface area and the BET method-converted particle diameter were different between the powder existing in a surface layer portion of the crucible and the powder existing in an internal portion of the crucible. The specific surface area of the powder in the surface layer portion of the crucible was 5.4 $m^2/g$, and the BET method-converted particle diameter thereof was 154.0 nm. The specific surface area of the powder in the internal portion of the crucible was 11.4 m²/g, and the BET method-converted particle diameter thereof was 73.0 nm.

In the powder (D-2), the average value of the BET method-converted particle diameters of the powder in the surface layer portion of the crucible and the powder in the internal portion of the crucible is 113.5 nm, and the difference (81.0 nm) between the BET method-converted particle diameters of the powder in the surface layer portion of the crucible and the powder in the internal portion of the crucible is 71% in terms of the proportion to the average value (113.5 nm) of the BET method-converted particle diameters, and it can be understood that a cerium oxide powder with the distribution of BET-converted particle diameters being broad was obtained.

Example 4

3 kg of the same cerium carbonate hydrate as in Example 1 was filled into each of 24 alumina-material containers of 280 mm in longitudinal dimension×237 mm in lateral dimension× 97 mm in depth. After the containers were charged into a 0.5 m³-electric furnace, the temperature was raised at a temperature rise speed of 60° C./hour from the room temperature to 350° C., and was held at 350° C. for 5 hours. Next, the temperature was raised at a temperature rise speed of 120° C./hour to 764° C., and was held at 764° C. for 15 hours. From each of the 24 alumina-material containers, 1.5 kg of powder was obtained. Each powder was subjected to measurement with a powder X-ray diffraction apparatus, and was found to be cerium oxide. A total of 24 samples obtained by taking one sample from each of the 24 alumina-material containers were subjected to measurement of the BET method-converted particle diameters of cerium oxide. The average value thereof was 57.8 nm, and the standard deviation was 4.6 nm, and the value calculated through the expression I was 8. Thus, it can be understood that a cerium oxide powder with the distribution of BET-converted particle diameters being sharp was obtained. This cerium oxide powder was observed with a scanning type electron microscope, and was found to be of agglomerated particles having primary particle diameters of 20 nm to 40 nm.

135 kg of partially stabilized zirconia beads of 1 mmφ was charged into an SUS-made container of 15 cm in radius×73 cm in length lined with polyethylene. Furthermore, 13.5 kg of the obtained cerium oxide powder, 27 kg of pure water and 186 g of nitric acid of 10% by mass were charged thereinto, and pulverization was carried out at 35 rpm for 6 hours. After the beads were separated while being washed by water drive using pure water, an aqueous cerium oxide slurry of 20% by mass in solid content concentration, pH5.3, and 47 μm/S in electric conductivity was obtained. The BET method-converted particle diameter of the powder obtained by drying the slurry at 300° C. was 37 nm, and the average particle diameter thereof obtained through a laser diffraction method was 175 nm. The proportion of small particles smaller than 30 nm in this slurry was 12.6% by mass, and the BET-converted particle diameter of large particles was 45.7 nm.

Comparative Example 3

3 kg of the same cerium carbonate hydrate as in Example 1 was filled into each of 63 alumina-material containers of 280 mm in longitudinal dimension×237 mm in lateral dimension× 97 mm in depth. After the containers were charged into a 2 m³-gas calcining furnace, the temperature was raised at a temperature rise speed of 120° C./hour from the room temperature to 350° C., and was held at 350° C. for 5 hours. Next, the temperature was raised at a temperature rise speed of 120° C./hour to 750° C., and was held at 750° C. for 15 hours. From each of the 63 alumina-material containers, 1.5 kg of powder was obtained. Each powder was subjected to measurement with a powder X-ray diffraction apparatus, and was found to be cerium oxide. A total of 63 samples obtained by taking one sample from each of the 63 alumina-material containers were subjected to measurement of the BET method-converted particle diameters of cerium oxide. The average value thereof was 58.5 nm, and the standard deviation was 14.0 nm, and the value calculated through the expression I was 24. Thus, it can be understood that a cerium oxide powder with the distribution of BET-converted particle diameters being broad was obtained. This cerium oxide powder was observed with a scanning type electron microscope. Ghost particles of platy cerium carbonate particles and primary particles of 400 nm to 500 nm were observed in addition to agglomerated particles having primary particle diameters of 20 nm to 40 nm.

135 kg of partially stabilized zirconia beads of 1 mmφ was charged into an SUS-made container of 15 cm in radius×73 cm in length lined with polyethylene. Furthermore, 13.5 kg of the obtained cerium oxide powder, 27 kg of pure water and 186 g of nitric acid of 10% by mass were charged, and pulverization was carried out at 35 rpm for 6 hours. After the beads were separated while being washed by water drive using pure water, an aqueous cerium oxide slurry of 20% by mass in solid content concentration, pH4.5, and 82 μm/S in electric conductivity was obtained. The BET method-converted particle diameter of the powder obtained by drying the slurry at 300° C. was 40 nm, and the average particle diameter thereof obtained through a laser diffraction method was 185 nm. The proportion of small particles smaller than 30 nm in this slurry was 13.9% by mass, and the BET-converted particle diameter of large particles was 44.8 nm. Cerium oxide particles of this slurry were observed with a scanning type electron microscope. Coarse particles of 1 μm or larger, which were not seen in the cerium oxide powder of Example 3, were observed.

Example 5

5 g of cerium carbonate hydrate (50% by mass in terms of $CeO_2$ was contained) having platy particles of 2 μm to 10 μm based on observation with a scanning type electron microscope and an average particle diameter of 38 μm based on a laser diffraction method was charged into a Pyrex glass calcining tube of 30 mmφ×600 mm, and the temperature thereof was raised at a temperature rise speed of 60° C./hour from the room temperature to 210° C. On this occasion, during the heating up to 100° C., a dry air of 0.9 liter/minute was introduced, and from the calcining above 100° C. on, a humidified mixture gas which was obtained by bubbling a hot bath of 93° C. with air of 0.9 liter/minute and whose partial pressure ratio calculated through the expression II was 0.7 was introduced into the Pyrex glass calcining tube. After the temperature reached 210° C., the humidified gas was immediately stopped, and a powder (A-5) obtained was cooled, and was taken out of the Pyrex glass calcining tube.

The powder (A-5) was subjected to measurement with a powder X-ray diffraction apparatus. The spectral peaks coincided with the characteristic peaks of cerium oxide, and the X-ray crystallite diameter measured from the hk1 (111) peak was 17.5 nm. Furthermore, the specific surface area of the powder (A-5) was 146 m²/g, and the BET method-converted particle diameter thereof was 5.7 nm.

Similarly, 5 g of the aforementioned cerium carbonate hydrate (50% by mass in terms of $CeO_2$ was contained) was charged into a Pyrex glass calcining tube of 30 mmφ×600 mm, and the temperature thereof was raised at a temperature rise speed of 60° C./hour from the room temperature to 210° C. On this occasion, during the calcining up to 100° C., a dry air of 0.9 liter/minute was introduced, and from the heating above 100° C. on, a humidified mixture gas which was obtained by bubbling a hot bath of 93° C. with air of 0.9 liter/minute and whose partial pressure ratio calculated through the expression II was 0.7 was introduced into the Pyrex glass calcining tube. After the temperature reached 210° C., the humidified gas was immediately stopped. After that, the temperature was raised at a temperature rise speed of 120° C./hour to 350° C., and was held at 350° C. for 5 hours, and was raised to 770° C., and was held at 770° C. for 15 hours, and then was cooled to the room temperature, so that 2.5 g of a powder (B-5) was obtained.

The powder (B-5) was subjected to measurement with a powder X-ray diffraction apparatus, and was found to be cerium oxide. The X-ray crystallite diameter measured from the hk1 (111) peak was 25.7 nm. Furthermore, the specific surface area of the powder (B-5) was 15.2 $m^2/g$, and the BET method-converted particle diameter thereof was 55 nm. From observation with a scanning type electron microscope, the primary particle diameter was found to be 20 to 40 nm.

Example 6

5 g of the same cerium carbonate hydrate (50% by mass in terms of $CeO_2$ was contained) as in Example 5 was charged into a Pyrex glass calcining tube of 30 mmφ×600 mm, and the temperature thereof was raised at a temperature rise speed of 30° C./hour from the room temperature to 210° C. On this occasion, during the heating up to 100° C., a dry air of 0.9 liter/minute was introduced, and from the calcining above 100° C. on, a humidified mixture gas which was obtained by bubbling a hot bath of 93° C. with air of 0.9 liter/minute and whose partial pressure ratio calculated through the expression II was 0.7 was introduced into the Pyrex glass calcining tube. After the temperature reached 210° C., the humidified gas was switched to a dry air, and the temperature was raised at 60° C./hour to 350° C. Then the temperature was further raised at a temperature rise speed of 120° C./hour to 770° C., and was held at 770° C. for 15 hours, and then was cooled to the room temperature, so that 2.5 g of a powder (B-6) was obtained.

The powder (B-6) was subjected to measurement with a powder X-ray diffraction apparatus, and was found to be cerium oxide. The X-ray crystallite diameter on the hk1 (111) surface was 28.5 nm. Furthermore, the specific surface area of the powder (B-6) was 13.0 $m^2/g$, and the BET method-converted particle diameter thereof was 64 nm. From observation with a scanning type electron microscope, the primary particle diameter of the powder (B-6) was found to be 20 to 40 nm.

Example 7

5 g of the same cerium carbonate hydrate (50% by mass in terms of $CeO_2$ was contained) as in Example 5 was charged into a Pyrex glass calcining tube of 30 mmφ×600 mm, and the temperature thereof was raised at a temperature rise speed of 30° C./hour from the room temperature to 210° C. On this occasion, during the heating up to 100° C., a dry air of 0.9 liter/minute was introduced, and from the calcining above 100° C. on, a humidified mixture gas which was obtained by bubbling a hot bath of 80° C. with air of 0.9 liter/minute and whose partial pressure ratio calculated through the expression II was 0.55 was introduced into the Pyrex glass calcining tube. After the temperature reached 210° C., the humidified gas was stopped, and without holding the temperature, cooling was carried out. A powder (A-7) obtained was taken out of the Pyrex glass calcining tube.

The powder (A-7) was subjected to measurement with a powder X-ray diffraction apparatus. The spectral peaks coincided with the characteristic peaks of cerium oxide, and the X-ray crystallite diameter on the hk1 (111) surface was 14.9 nm. Furthermore, the specific surface area of the powder (A-7) was 167 $m^2/g$, and the BET method-converted particle diameter thereof was 5.0 nm.

Similarly, 5 g of the aforementioned cerium carbonate hydrate (50% by mass in terms of $CeO_2$ was contained) was charged into a Pyrex glass calcining tube of 30 mmφ×600 mm, and the temperature thereof was raised at a temperature rise speed of 30° C./hour from the room temperature to 210° C. On this occasion, during the heating up to 100° C., a dry air of 0.9 liter/minute was introduced, and from the calcining above 100° C. on, a humidified mixture gas which was obtained by bubbling a hot bath of 80° C. with air of 0.9 liter/minute and whose partial pressure ratio calculated through the expression II was 0.55 was introduced into the Pyrex glass calcining tube. After the temperature reached 210° C., the humidified gas was stopped. After that, the temperature was raised at a temperature rise speed of 120° C./hour to 350° C., and was held at 350° C. for 5 hours, and was raised to 770° C., and was held at 770° C. for 15 hours, and then was cooled to the room temperature, so that 2.5 g of a powder (B-7) was obtained.

The powder (B-7) was subjected to measurement with a powder X-ray diffraction apparatus, and was found to be cerium oxide. The X-ray crystallite diameter on the hk1 (111) surface was 27.7 nm. Furthermore, the specific surface area of the powder (B-7) was 14.1 $m^2/g$, and the BET method-converted particle diameter thereof was 59 nm. From observation with a scanning type electron microscope, the primary particle diameter of the powder (B-7) was found to be 20 to 40 nm.

Example 8

5 g of the same cerium carbonate hydrate (50% by mass in terms of $CeO_2$ was contained) as in Example 5 was charged into a Pyrex glass calcining tube of 30 mmφ×600 mm, and the temperature thereof was raised at a temperature rise speed of 60° C./hour from the room temperature to 350° C. On this occasion, during the heating up to 100° C., a dry air of 0.9 liter/minute was introduced, and from the calcining above 100° C. on, a humidified mixture gas which was obtained by bubbling a hot bath of 93° C. with air of 0.9 liter/minute and whose partial pressure ratio calculated through the expression II was 0.7 was introduced into the Pyrex glass calcining tube. After the temperature reached 350° C., the introduction of the humidified gas was stopped, and without holding the temperature, cooling was carried out. A powder (A-8) obtained was taken out of the Pyrex glass calcining tube.

The powder (A-8) was subjected to measurement with a powder X-ray diffraction apparatus. The spectral peaks coincided with the characteristic peaks of cerium oxide, and the X-ray crystallite diameter on the hk1 (111) surface was 17.1 nm. Furthermore, the specific surface area of the powder (A-8) was 141 $m^2/g$, and the BET method-converted particle diameter thereof was 5.9 nm.

Similarly, 5 g of the same cerium carbonate hydrate (50% by mass in terms of $CeO_2$ was contained) as the aforementioned one was charged into a Pyrex glass calcining tube of 30 mmφ×600 mm. During the heating up to 100° C., a dry air of 0.9 liter/minute was introduced, and from the calcining above 100° C. on, a humidified mixture gas which was obtained by bubbling a hot bath of 93° C. with air of 0.9 liter/minute and whose partial pressure ratio calculated through the expression II was 0.7 was introduced into the Pyrex glass calcining tube. After the temperature was raised at a temperature rise speed of 60° C./hour from the room temperature to 350° C., the humidified gas was stopped. After that, the temperature was raised at a temperature rise speed of 120° C./hour to 770° C., and was held at 770° C. for 15 hours, and then was cooled to the room temperature, so that 2.5 g of a powder (B-8) was obtained.

The powder (B-8) was subjected to measurement with a powder X-ray diffraction apparatus, and was found to be cerium oxide. The X-ray crystallite diameter on the hk1 (111) surface was 35.1 nm. Furthermore, the specific surface area of the powder (B-8) was 12.4 m$^2$/g, and the BET method-converted particle diameter thereof was 67 nm. From observation with a scanning type electron microscope, the primary particle diameter of the powder (B-8) was found to be 20 to 50 nm.

Comparative Example 4

5 g of the same cerium carbonate hydrate (50% by mass in terms of CeO$_2$ was contained) as in Example 5 was charged into a Pyrex glass calcining tube of 30 mmφ×600 mm. During the heating up to 100° C., a dry air of 0.9 liter/minute was introduced, and from the calcining above 100° C. on, a humidified mixture gas which was obtained by bubbling a hot bath of 65° C. with air of 0.9 liter/minute and whose partial pressure ratio calculated through the expression II was 0.2 was introduced into the Pyrex glass calcining tube. After the temperature was raised at a temperature rise speed of 60° C./hour from the room temperature to 210° C., the humidified gas was stopped, and without holding the temperature, cooling to the room temperature was carried out. A powder (C-4) obtained was taken out of the Pyrex glass calcining tube.

The powder (C-4) was subjected to measurement with a powder X-ray diffraction apparatus. The spectral peaks coincided with the characteristic peaks of cerium oxide, and the X-ray crystallite diameter on the hk1 (111) surface was 7.1 nm. Furthermore, the specific surface area of the powder (C-4) was 174 m$^2$/g, and the BET method-converted particle diameter thereof was 4.8 nm.

Similarly, 5 g of the aforementioned cerium carbonate hydrate (50% by mass in terms of CeO$_2$ was contained) was charged into a Pyrex glass calcining tube of 30 mmφ×600 mm. During the heating up to 100° C., a dry air of 0.9 liter/minute was introduced, and from the calcining above 100° C. on, a humidified mixture gas which was obtained by bubbling a hot bath of 65° C. with air of 0.9 liter/minute and whose partial pressure ratio calculated through the expression II was 0.2 was introduced into the Pyrex glass calcining tube. After the temperature was raised at a temperature rise speed of 60° C./hour from the room temperature to 210° C., the humidified gas was stopped. After that, the temperature was raised at a temperature rise speed of 120° C./hour to 350° C., and was held at 350° C. for 5 hours, and then was raised to 770° C., and was held at 770° C. for 15 hours, and then was cooled to the room temperature, so that 2.5 g of a powder (D-4) was obtained.

The powder (D-4) was subjected to measurement with a powder X-ray diffraction apparatus, and was found to be cerium oxide. The X-ray crystallite diameter on the hk1 (111) surface was 80.1 nm. Furthermore, the specific surface area of the powder (D-4) was 3.9 m$^2$/g, and the BET method-converted particle diameter thereof was 211 nm. From observation with a scanning type electron microscope, it was found that the primary particle diameter of the powder (D-4) was 20 to 300 nm and the powder (D-4) was nonuniform.

Example 9

400 g of the same cerium carbonate hydrate (50% by mass in terms of CeO$_2$ was contained) as in Example 5 was charged into an SUS-made calcining tube of 20 mmφ×600 mm. During the heating up to 100° C., a dry air of 5 liters/minute was introduced, and from the calcining above 100° C. on, a humidified mixture gas which was obtained by bubbling a hot bath of 93° C. with air of 5 liters/minute and whose partial pressure ratio calculated through the expression II was 0.7 was introduced into the SUS-made calcining tube. After the temperature was raised at a temperature rise speed of 30° C./hour from the room temperature to 210° C., the humidified gas was switched to a dry air of 5 liters/minute. Then, the temperature was raised at a temperature rise speed of 120° C./hour to 350° C., and was held at 350° C. for 5 hours, and then was further raised to 764° C., and was held at 764° C. for 15 hours, and then was cooled to the room temperature, so that 200 g of a powder (B-9) was obtained.

The powder (B-9) was subjected to measurement with a powder X-ray diffraction apparatus. The spectral peaks coincided with the characteristic peaks of cerium oxide. Furthermore, the specific surface area of the powder (B-9) obtained through the BET method was 14.2 m$^2$/g, and the BET method-converted particle diameter thereof was 58.6 nm. From observation with a scanning type electron microscope, the primary particle diameter of the powder (B-9) was found to be 20 to 40 nm. By repeating the above-described operation twice, a total of 400 g of the powder (B-9) was obtained.

3.8 kg of partially stabilized zirconia beads of 1 mmφ was charged into a polyethylene-made container of 7 cm in radius×21 cm in length. Furthermore, 380 g of the obtained cerium oxide powder (B-9), 760 g of pure water and 5.8 g of 10% nitric acid were charged thereinto, and pulverization was carried out at 60 rpm for 4 hours. After the beads were separated while being washed by water drive using pure water, an aqueous cerium oxide slurry of 20% by mass in solid content concentration, pH5.5, and 27 μm/S in electric conductivity was obtained. The BET method-converted particle diameter of the powder obtained by drying the slurry at 300° C. was 41 nm. The particle diameter of the powder (B-9) measured through a laser diffraction method was $D_{10}$=79 nm, $D_{50}$=285 nm, and $D_{90}$=1313 nm.

Comparative Example 5

400 g of the same cerium carbonate hydrate (50% by mass in terms of CeO2 was contained) as in Example 5 was charged into an SUS-made calcining tube of 20 mmφ×600 mm. While a not-humidified air of 5 liters/minute was being introduced, the temperature was raised at a temperature rise speed of 120° C./hour to 350° C., and was held at 350° C. for 5 hours, and then was further raised to 705° C., and was held at 705° C. for 15 hours, and then was cooled to the room temperature, so that 200 g of a powder (D-5) was obtained.

The powder (D-5) was subjected to measurement with a powder X-ray diffraction apparatus. The spectral peaks coincided with the characteristic peaks of cerium oxide. Furthermore, the specific surface area of the powder (D-5) obtained through the BET method was 22.7 m$^2$/g, and the BET method-converted particle diameter thereof was 65.6 nm.

From observation with a scanning type electron microscope, the primary particle diameter of the powder (D-5) was found to be 20 to 80 nm. By repeating the above-described operation twice, a total of 400 g of the powder (D-5) was obtained.

3.8 kg of partially stabilized zirconia beads of 1 mmϕ was charged into a polyethylene-made container of 7 cm in radius×21 cm in length. Furthermore, 380 g of the obtained cerium oxide powder (D-5), 760 g of pure water and 5.8 g of 10% nitric acid were charged thereinto, and pulverization was carried out at 60 rpm for 4 hours. After the beads were separated while being washed by water drive using pure water, an aqueous cerium oxide slurry of 20% by mass in solid content concentration, pH5.5, and 31 μm/S in electric conductivity was obtained. The BET method-converted particle diameter of the powder obtained by drying the slurry at 300° C. was 37 nm. The particle diameter of the powder (D-5) measured through a laser diffraction method was $D_{10}=108$ nm, $D_{50}=530$ nm, and $D_{90}=1564$ nm.

Comparative Example 6

400 g of the same cerium carbonate hydrate (50% by mass in terms of CeO2 was contained) as in Example 5 was charged into an SUS-made calcining tube of 20 mmϕ×600 mm. While a not-humidified air of 5 liters/minute was being introduced, the temperature was raised at 120° C./hour to 350° C., and was held at 350° C. for 5 hours, and then was further raised to 764° C., and was held at 764° C. for 15 hours, and then was cooled to the room temperature, so that 200 g of a powder (D-6) was obtained.

The powder (D-6) was subjected to measurement with a powder X-ray diffraction apparatus. The spectral peaks coincided with the characteristic peaks of cerium oxide. Furthermore, the specific surface area of the powder (D-6) obtained through the BET method was 9.2 m$^2$/g, and the BET method-converted particle diameter thereof was 90.7 nm. From observation with a scanning type electron microscope, the primary particle diameter of the powder (D-6) was found to be 20 to 200 nm. By repeating the above-described operation twice, a total of 400 g of the powder (D-6) was obtained.

3.8 kg of partially stabilized zirconia beads of 1 mmϕ was charged into a polyethylene-made container of 7 cm in radius×21 cm in length. Furthermore, 380 g of the obtained cerium oxide powder (D-6), 760 g of pure water and 5.8 g of 10% nitric acid were charged thereinto, and pulverization was carried out at 60 rpm for 4 hours. After the beads were separated while being washed by water drive using pure water, an aqueous cerium oxide slurry of 20% by mass in solid content concentration, pH5.1, and 50 μm/S in electric conductivity was obtained. The BET method-converted particle diameter of the powder obtained by drying the slurry at 300° C. was 52.0 nm. The particle diameter of the powder measured through a laser diffraction method was $D_{10}=416$ nm, $D_{50}=755$ nm, and $D_{90}=1346$ nm.

3.8 kg of partially stabilized zirconia beads of 1 mmϕ was charged into a polyethylene-made container of 7 cm in radius×21 cm in length. Furthermore, 380 g of the obtained cerium oxide powder (D-6), 760 g of pure water and 5.8 g of 10% nitric acid were charged thereinto, and pulverization was carried out at 60 rpm for 7 hours and fifteen minutes. After the beads were separated while being washed by water drive using pure water, an aqueous cerium oxide slurry of 20% by mass in solid content concentration, pH5.1, and 50 μm/S in electric conductivity was obtained. The BET method-converted particle diameter of the powder obtained by drying the slurry at 300° C. was 42 nm. The particle diameter of the powder measured through a laser diffraction method was $D_{10}=65$ nm, $D_{50}=135$ nm, and $D_{90}=666$ nm.

(Preparation of Abrasive Liquid and Abrasive Test—Test 1)

The aqueous cerium oxide slurries obtained in Example 4 and Comparative Example 3 were diluted with pure water to 0.5% by mass in the solid content concentration, whereby abrasive liquids were prepared.

The abrasive test was performed as stated below.

As workpieces to be processed, 200-mm silicon wafers with a TEOS film (oxide film 10000 Å) were used. A foamed polyurethane-made abrasive cloth (equipped with trade name IC-1000 groove) was stuck to the surface table of a single-face polisher made by Lapmaster (KK), and a substrate's polish surface was set so as to face the abrasive cloth, and was polished with a load of 20 kPa applied.

The surface table revolution speed was 50 revolutions per minute. With an amount of slurry supply of 200 mL/minute, polishing was carried out for 90 seconds.

After the polishing, the workpiece was taken out, and was washed. After that, the polishing speed was computed from the number of remaining particles and the remaining oxide film thickness.

Results regarding the polishing speed and the number of remaining particles in the abrasive test in which the abrasive liquids prepared from the aqueous cerium oxide slurries of Example 4 and Comparative Example 3 were used are shown in Table 1.

TABLE 1

| Kind of abrasive liquid | Polishing speed (nm/min.) | Number of remaining particles of 0.2 μm or larger (pieces/wafer) | Number of scratches |
|---|---|---|---|
| Example 4 | 76 | 11 | Small |
| Comparative Example 3 | 77 | 21 | Large |

From table 1, in a comparison between the case where the abrasive liquid prepared from the aqueous cerium oxide slurry of Example 4 was used and the case where the abrasive liquid prepared from the aqueous cerium oxide slurry of Comparative Example 3 was used, it can be understood that the number of remaining particles and the number of scratches were smaller and excellent polishing characteristics were obtained in the case where the abrasive liquid prepared from the aqueous cerium oxide slurry of Example 4 containing oxide cerium particles having uniform BET method-converted particle diameters was used.

(Preparation of Abrasive Liquid and Abrasive Test—Test 2)

The aqueous cerium oxide slurries obtained in Example 9 and Comparative Example 5 were diluted with pure water to 10% by mass in the solid content concentration, whereby abrasive liquids were prepared.

The abrasive test was performed as stated below.

As workpieces to be polished, quartz glass pieces of 100 mm in diameter were used. A nonwoven type polyurethane abrasive cloth (equipped with trade name Suba 600, 430 mmϕ, made by Rodel Nitta (KK)) was stuck to the surface table of a single-face polisher made by Techno Rise (KK), and a substrate's polish surface was set so as to face the abrasive cloth, and was polished with a load of 20 kPa applied.

The surface table revolution speed was 40 revolutions per minute. With an amount of slurry supply of 10 mL/minute, polishing was carried out for 10 minutes.

After the polishing, the workpiece was taken out, and was washed. After that, the polishing speed was computed from the weight reduction, and the polished surface of each piece was visually observed for defects.

Results regarding the polishing speed and the visual observation in the abrasive test in which the abrasive liquids prepared from the aqueous cerium oxide slurries of Example 9 and Comparative Example 5 were used are shown in Table 2.

TABLE 2

| Kind of abrasive liquid | BET method-converted particle diameter (nm) | Laser diffraction method particle diameter $D_{50}$ (nm) | Polishing speed (nm/min.) | Visual observation |
|---|---|---|---|---|
| Example 9 | 39 | 285 | 111 | No scratch |
| Comparative Example 5 | 37 | 530 | 90 | Scratches and defects present |

From Table 2, it can be understood that cerium oxide particles contained in the abrasive liquid from Comparative Example 5 has a large average particle diameter measured through the laser diffraction method although they have a small BET method-converted particle diameter. This means that the cerium oxide particles contained in the abrasive liquid from Comparative Example 5 include particles having very small particle diameters and particles having very large particle diameters. Therefore, the case where the abrasive liquid prepared from the aqueous cerium oxide slurry of Example 9 was used and the case where the abrasive liquid prepared from the aqueous cerium oxide slurry of Comparative Example 5 was used are compared as follows. In the case where the abrasive liquid from Comparative Example 5 was used, the polishing speed was slow, and small scratches were seen in the visual observation. On the other hand, in the case where the abrasive liquid from Example 9 was used, the polishing speed was fast, and no scratch was present in the polished surface, and it can be understood that excellent polishing characteristics were obtained.

In order to obtain cerium oxide of a BET method-converted particle diameter substantially equal to that of Example 9, Comparative Example 6 needs nearly twice the pulverizing time. Thus, Comparative Example 6 is poor in productivity. Furthermore, the primary particle diameter distribution of oxide cerium of Comparative Example 6 is wide, and large particles of 200 nm are present. Therefore, a problem of degradation of the polished surface quality is caused.

INDUSTRIAL APPLICABILITY

The aqueous cerium oxide slurry containing cerium oxide particles obtained through the production method of the present invention can be used as a final finishing abrasive for various substrates whose main component is silica.

The invention claimed is:

1. A method of producing cerium oxide particles by raising a temperature of a cerium compound from a normal temperature and heating the cerium compound to a temperature range of 400° C. to 1200° C., in which the method comprises at least a temperature raising stage of a temperature rise speed of 2° C./hour to 60° C./hour.

2. The production method for cerium oxide particles according to claim 1, wherein the temperature raising stage of the temperature rise speed of 2° C./hour to 60° C./hour is a first temperature raising stage that is continued until the temperature reaches a temperature range of 200° C. to 350° C. after rising from the normal temperature.

3. The production method for cerium oxide particles according to claim 2, wherein after the first temperature raising stage, heating is performed up to the temperature range of 400° C. to 1200° C. in a second temperature raising stage of a temperature rise speed of 2° C./hour to 200° C./hour.

4. The production method for cerium oxide particles according to claim 1, wherein after the temperature reaches the temperature range of 400° C. to 1200° C., the temperature is maintained for 10 minutes to 240 hours.

5. A method of producing cerium oxide particles comprising:
supplying a humidified gas in a cerium compound temperature raising process;
raising a temperature of a cerium compound from a normal temperature; and
heating the cerium compound to a temperature range of 400° C. to 1200° C., in which the method proceeds via a stage of heating while supplying a humidified gas in a temperature raising process;
wherein the humidified gas is supplied starting at a temperature of 100° C. or above, and is continuously supplied until a temperature of 200° C. to 350° C. is reached.

6. The production method for cerium oxide particles according to claim 5, wherein a water vapor in the humidified gas has a value of 0.5 to 0.8 in a partial pressure ratio calculated through the following expression II:

$$H_2O_p/(H_2O_p+gas_p) \quad (II)$$

in the expression, $H_2O_p$ represents the partial pressure of water vapor, and $gas_p$ represents the partial pressure of the gas.

7. The production method for cerium oxide particles according to claim 5, wherein the gas is an oxygen gas, a mixture gas of oxygen and nitrogen, or an air.

8. The production method for cerium oxide particles according to claim 5, wherein the cerium compound is a cerium carbonate hydrate.

* * * * *